(12) United States Patent
Mathews et al.

(10) Patent No.: US 11,815,871 B2
(45) Date of Patent: *Nov. 14, 2023

(54) I/O NETWORK MODULE WITH UNIQUE NETWORK ADDRESS

(71) Applicant: Phoenix Contact Development and Manufacturing, Inc., Middletown, PA (US)

(72) Inventors: Davis Mathews, Lewisberry, PA (US); David Nathan Katz, Hummelstown, PA (US)

(73) Assignee: Phoenix Contact Development and Manufacturing, Inc., Middletown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,035

(22) Filed: Nov. 14, 2022

(65) Prior Publication Data
US 2023/0074008 A1 Mar. 9, 2023

Related U.S. Application Data

(63) Continuation of application No. 16/710,733, filed on Dec. 11, 2019, now Pat. No. 11,500,347.

(51) Int. Cl.
*G05B 19/042* (2006.01)
*G06F 13/12* (2006.01)
*H04L 101/622* (2022.01)
*H04L 101/659* (2022.01)

(52) U.S. Cl.
CPC ....... *G05B 19/0423* (2013.01); *G06F 13/122* (2013.01); *H04L 2101/622* (2022.05); *H04L 2101/659* (2022.05)

(58) Field of Classification Search
None
See application file for complete search history.

(56) References Cited

U.S. PATENT DOCUMENTS

| | | | | |
|---|---|---|---|---|
| 7,953,073 | B2* | 5/2011 | Hassbjer | H01R 29/00 370/358 |
| 10,690,863 | B1* | 6/2020 | Mahdi Hayder | H04B 10/25891 |
| 10,739,745 | B1* | 8/2020 | Kretschmann | H04L 12/56 |
| 2004/0068535 | A1* | 4/2004 | Subbiah | H04L 61/2038 709/200 |
| 2010/0077111 | A1* | 3/2010 | Holmes | H04L 12/40013 710/33 |

(Continued)

FOREIGN PATENT DOCUMENTS

WO WO-9612993 A1 * 5/1996 ......... G05B 19/4185

*Primary Examiner* — Phyllis A Book
(74) *Attorney, Agent, or Firm* — Hooker & Habib, P.C.

(57) ABSTRACT

I/O network modules connect field devices to a process control network. Each I/O network module includes a set of electrical connectors for connecting a field device to the module and an I/O channel extending from the set of electrical connectors to a network port. The I/O channel includes a conversion circuit that converts between an I/O signal and network-compatible signals. Each I/O channel connected to the process control network through an I/O network module is associated with its own unique network address. This enables controllers and field devices on the process control network to communicate essentially directly with one another through the network.

21 Claims, 2 Drawing Sheets

(56) References Cited

U.S. PATENT DOCUMENTS

2015/0363344 A1* 12/2015 Bobbitt ................. G06F 13/122
                                                              710/316
2016/0006740 A1*  1/2016 Yun .................... H04L 63/0236
                                                              709/225
2020/0021874 A1*  1/2020 Blanton ............. H04L 12/2898

* cited by examiner

I/O NETWORK MODULE WITH UNIQUE NETWORK ADDRESS

RELATED APPLICATION

This application claims priority to and is a continuation of U.S. patent application Ser. No. 16/710,733 "I/O Module with Unique Network Address" filed Dec. 11, 2019 and pending on the filing date of the instant application, which priority application is incorporated by reference as if fully set forth herein.

BACKGROUND OF THE DISCLOSURE

Process control networks transmit I/O signals to and from field devices under the control of a control system that regulates and controls industrial processes. Field devices include sensors and actuators. Sensors transmit input signals representing the state of process variables to the controllers, and actuators receive output signals from the controllers and take action to affect process variables.

I/O signals may be analog signals or digital signals. Analog I/O signals are variable, in which a voltage or current represents the magnitude of a process parameter such as flow rate or the desired position of a valve. Digital I/O signals represent one of two states: "on/off", "opened/closed", and the like.

Other types of digital signals used in process control are used to actuate a relay or to count pulses.

Sophisticated industrial processes may use a number of field devices distributed over a wide area for process control. I/O field wiring from the field devices is often brought to a central location for ease of management. The field wiring may extend to sets of terminals of a terminal block contained in a wiring cabinet. A circuit (referred to as an I/O channel herein) extends from each set of terminals and is connected to a head station to transfer signals between the set of terminals and the head station.

The head station communicates with the field devices through the I/O channels and communicates with the control system through a separate network. The control system communicates with the head station and not directly with the individual field devices.

The head station uses a digital data format, typically a proprietary data format. The I/O channel includes a conversion circuit that converts between the I/O signal format used by the connected field device and the digital data format required by the head station.

Fixed-mode conversion circuits convert between one type of I/O signal and a digital data format.

Selectable-mode conversion circuits selectively convert between different types of I/O signals and a digital data format. Selectable-mode conversion circuits allow different types of field devices to be connected to a set of terminals of the terminal block.

Brodbeck, et al. U.S. Pat. No. 9,971,727 "Universal I/O Signal Interposer System", assigned to the applicant and incorporated by reference herein, discloses that removable I/O modules can be inserted or interposed in the I/O channel to process the I/O signals, supply power to field devices, interpose fuses or other ancillaries in the signal path, and other functions.

The use of removable I/O modules and selectable-mode conversion circuits provides great flexibility in wiring field devices to the wiring cabinet. However, the control system must continue to communicate through the head station or to I/O cards of the control system and does not communicate directly with field devices.

It is desired to provide increased capability of the control system and field devices to communicate in a process control network.

SUMMARY OF THE DISCLOSURE

Disclosed are I/O network modules for a digital process control network. An I/O network module includes an I/O channel connected to a network port that connects the I/O network module to the process control network. The network port is compatible with the physical layer of the process control network and is configured to operate using network protocols compatible with the process control network.

Standardized protocols such as TCP/IP, Profinet, UDP, etc. are used in many process control networks and embodiments of I/O network modules can be provided for use with different network protocols.

Each I/O channel is associated with its own unique network address. The network port attaches the I/O network module to the process control network and enables essentially direct communication between the control system and the field device through the network port and the I/O channel. The process control network may also allow direct field device-to-field device communications through the network.

The I/O channel is provided with a conversion circuit that converts the signal transmitted along the I/O channel between the I/O signal format used by the field device and a digital data format compatible with the process control network. An I/O channel may also include a microprocessor and other circuit components necessary for its operation, including setting the mode of operation of any selectable-mode conversion circuits.

In embodiments, the conversion circuit is a fixed-mode conversion circuit operable in only one mode to convert one type of I/O signal. In other embodiments, the conversion circuit is a selectable-mode conversion circuit that can convert different types of I/O signals. The operating mode of the selectable mode conversion circuit can be set by the control system through the network or set automatically in response to the type of field device being attached to the I/O channel.

In further possible embodiments, the I/O channel is configured to allow a removable interposer or I/O module to be inserted in the I/O channel to process the I/O signals, supply power to field devices, interpose fuses or other ancillaries in the signal path, and the like as described in the '727 patent, or to provide other functions.

In yet further possible embodiments, the I/O channel and the network port are configured for connection to a process control network utilizing a standardized physical layer and network protocol; for example an Ethernet network using the TCP/IP protocol. The network may be a wired network using, as a non-limiting example, twisted-pair wiring, or a wireless network, using, for example, wireless Ethernet. The I/O channel may be provided with or otherwise associated with a media access control address (MAC address) or other addressing protocol that uniquely identifies the network port.

In use in some networks, such as networks complying with the Advanced Physical Layer (APL) standard, the disclosed I/O network module allows for the bridging between non-intrinsically safe zones (such as controller locations) and hazardous zones or explosive zones requiring intrinsic safety.

The I/O network module may be provided as a "dongle" or single-channel I/O network module that includes a set of electrical connectors for connecting the field wires of a single field device. The set of electrical connectors forms part of a single I/O channel extending to a network port. The single-channel I/O network module may be inserted adjacent to an existing termination of the field wires of the field device by cutting or otherwise removing the wires from existing terminals and reattaching them to the set of electrical connectors of the single-channel module.

The single-channel I/O network module can be reprogrammed or replaced with another single-channel I/O network module to change the type of network (for example, from an Ethernet network to a network having a different physical layer) or to change the network data format from, say, Ethernet/IP to OPC UA, with no change to the field device and often without the need to replace the signal wires extending from the field device.

Embodiments of the I/O channel of the single-channel I/O network module may be configured to receive a removable interposer or I/O module for signal processing and the like as previously described.

The single-channel I/O network module associates a network port with a single field device. In other embodiments a multi-channel I/O network module associates a network port with multiple field devices.

In Ethernet-based embodiments, for example, the I/O network module includes an Ethernet switch disposed in the module so that the network port can transmit out to the rest of the network and functions to hide other network locations behind it. This enables creation of firewalls and VPNs (Virtual Private Networks) between a controller of the process control network and the field devices of the process control network. Creating a cybersecurity function between the controller and the field devices reduces the potential attack vectors for bad actors to access the process control network.

The multi-channel I/O network module includes multiple sets of electrical connectors configured to connect to respective sets of field wires of multiple field devices. The sets of electrical connectors may be formed, as a non-limiting example, as a terminal block having multiple sets of terminals for connecting the field wires to multiple I/O channels, each set of terminals forming part of a respective I/O channel. The multiple I/O channels terminate at a signal processing circuit connected to the network port. The signal processing circuit transfers data received from the I/O channels to the network port and distributes data received from the network port to the appropriate I/O channel.

Each I/O channel may be configured to receive a removable interposer or I/O module as previously described.

One or more single-channel I/O network modules and/or one or more multi-channel modules may be connected to the process control network. Each I/O channel may be associated with its own unique network address using, for example, internet protocols such as IPv4 or IPv6. Embodiments of the disclosed I/O network module having a single network port may utilize forthcoming multi-drop Ethernet technology (expected as a coming addendum to the 802.3.cg standard or potentially a new industry standard on its own).

The process control network may utilize network topologies designed for redundancy and/or security and may include additional network hardware such as switches and hubs that are known in the network art.

Embodiments of the disclosed single-channel or multi-channel I/O network modules may include two network ports that allow for daisy chaining of I/O network modules or I/O network modules and other network devices, and permit use in ring network topologies requiring devices having two network ports for network redundancy.

Other objects and features of the disclosure will become apparent as the description proceeds, especially when taken in conjunction with the accompanying drawing sheets illustrating one or more non-limiting embodiments.

DETAILED DESCRIPTION

Figure 1:
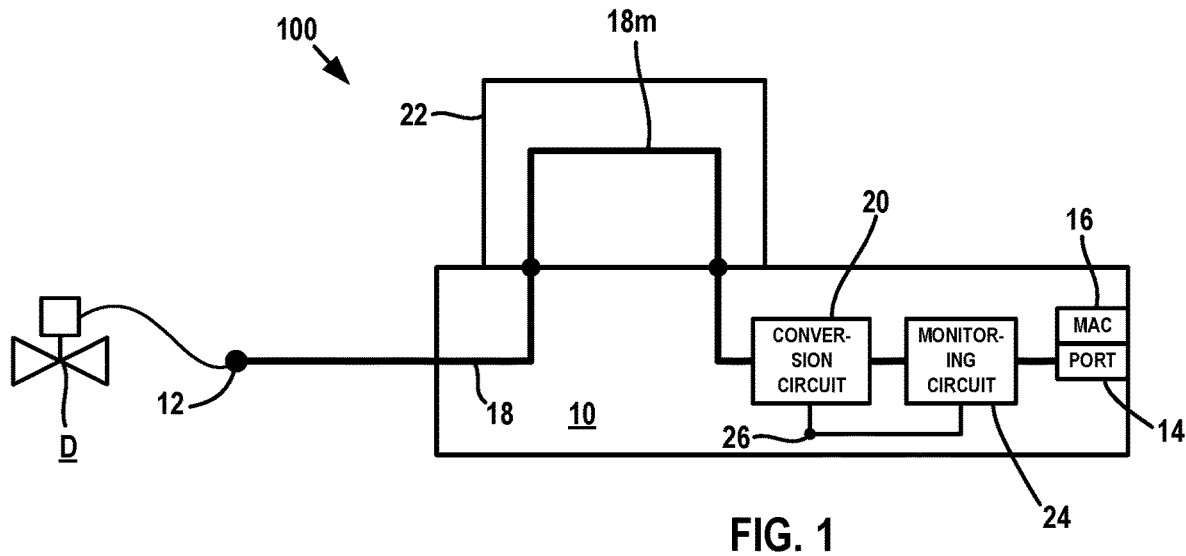
FIG. 1 is a schematic side view of a single-channel I/O network module in accordance with this disclosure, shown attached to the field wires of a field device.

FIG. 1 schematically illustrates a non-limiting embodiment of a single-channel I/O network module 100 for use with an Ethernet-based process control network. The illustrated single-channel I/O network module connects a set of field wires of a field device D to the process control network utilizing a standard Ethernet-compatible network port.

I/O network modules for wired process control networks having different physical layers or wireless process control networks would include a different type wired or wireless network port (for example, an M12 or two-wire terminal block in the case of T1L networks) compatible with the process control network the I/O network module is intended to connect with. A network port may include a single port to receive/transmit data or two or more ports to enable daisy chaining or use in single- or double-ring network topologies for example.

The single-channel I/O network module 100 includes a base 10 that includes a set 12 of one or more electrical connectors formed in the illustrated embodiment as a set of terminals for terminating the set of field wires of the field device, an Ethernet-compatible RJ-45 network port 14 having an associated MAC address 16 for connecting the I/O network module to an Ethernet network, and an I/O channel 18 connecting the terminals with the network port. The network port 14 may be configured to operate as a managed switch or as an unmanaged switch as determined by the network requirements.

A field device may have a set of one or more field wires, and the set of electrical connectors that connect the field wires to the I/O network module can be configured to connect different numbers of field wires and different types of field wire terminations.

The illustrated I/O channel 18 includes a selectable-mode conversion circuit 20 that converts data between the field device I/O signal format and a digital data protocol (for example, Ethernet/IP or OPC United Architecture [OPC UA]) used by the control system. Examples of selectable-mode conversion circuits that can be adapted for use with the disclosed I/O signal processor include, but are not limited to, those provided by the commercially available ANALOG DEVICES AD74412R or AD74413R signal processing integrated circuits (Analog Devices, Inc., One Technology Way, Norwood Mass. 02062-9106 USA).

The I/O channel 18 extends through a removable interposer or I/O module 22 attached to the base 10 that can pass an I/O signal through a module I/O channel portion 18*m* unchanged, provide desired signal processing, interpose a fuse or other ancillary, or the like, as described in the '727 patent.

Other embodiments of I/O modules may provide diagnostics of the I/O channel during operation; enable pre-commissioning evaluation of attached field devices prior to normal operation of the process control network; analog signal scaling functions (for non-limiting examples, signals within a 24V signal range scaled to a 5V signal range, 4-20 ma signals converted to a voltage signal within a voltage range), or other functions.

Yet other embodiments of the I/O module 22 and the base 10 may output raw or processed diagnostic information related to the field device attached to the I/O channel or to the state or operating history of an ancillary in the module I/O channel portion through the network port 14.

A monitoring circuit 24 is disposed between the port 14 and the conversion circuit 20 and is connected to a programming port 26 of the conversion circuit. The monitoring circuit reads and monitors the data being transferred to and from the port, and can also write data to the port. The monitoring circuit can be powered using Power over Ethernet (POE), a separate power supply (not shown), or other conventional configurations.

The monitoring circuit 24 monitors the data for a command to set the operating mode of the conversion circuit 20. When such a command is received, the monitoring circuit issues a command to the programming port 26 setting the operating mode of the conversion circuit.

The monitoring circuit 24 also monitors data transmittal for purposes of security (for example, authentication, authorization, etc.) and network diagnostics, and can report security and network diagnostics information to a controller of the control system through the process control network.

The monitoring circuit 24 can also assure the conversion circuit 20 ignores and does not convert data received from the network port 14 intended for use by the monitoring circuit or generated by the monitoring circuit.

Figure 2:
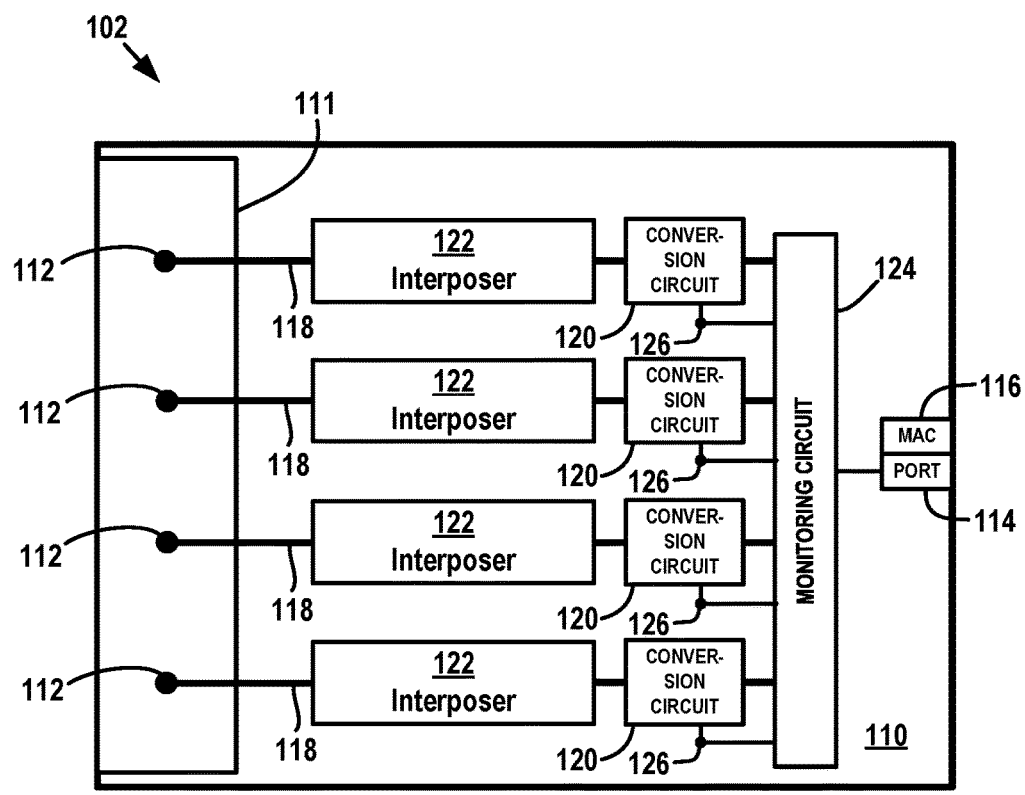
FIG. 2 is a schematic top view of a multi-channel I/O network module in accordance with the disclosure.

FIG. 2 schematically illustrates an embodiment of a multi-channel I/O network module 102. The multi-channel I/O network module is capable of connecting multiple field devices to a controller of a process control network through a network port. The illustrated multi-channel I/O network module connects up to four field devices to the network port (other embodiments could connect more than four or less than four field devices).

The illustrated multi-channel I/O network module 102 includes a base 110 having multiple sets of electrical connectors formed as a terminal block 111 containing four sets 112 of terminals for terminating the field wires of up to four field devices (not shown), an RJ-45 network port 114 having an associated MAC address 116 for connecting the I/O network module to an Ethernet-based process control network, and a respective I/O channel 118 extending from each set of terminals 112 and including a selectable-mode conversion circuit 120 and removable interposer 122. The I/O channels include in common a monitoring circuit 124 connected to the network port. The monitoring circuit is also connected to a programming port 126 of each conversion circuit.

The monitoring circuit 124 reads and monitors the data being transferred to and from the port 114, and can also write data to the port. The monitoring circuit can be powered using Power over Ethernet (POE) or from a separate power supply (not shown).

The monitoring circuit 124 monitors the data for a command to set the operating mode of a conversion circuit 120. When such a command is detected, the monitoring circuit issues a command to the programming port 126 of the appropriate conversion circuit, setting the operating mode of the conversion circuit.

The monitoring circuit 124 also monitors data transmittal for purposes of security and network diagnostics, and can report security and network diagnostics information to the control system through the network.

The monitoring circuit 124 also associates each I/O channel 118 with a network address that uniquely identifies the I/O channel and associates the port 114 MAC address with that network address. The monitoring circuit tags the data received from a conversion circuit with the IP address of the I/O channel and distributes data received through the port 114 to the proper I/O channel based on IP address.

The multi-channel I/O network module 102 enables a single network port to connect multiple field devices to the network such that the control system interacts with the field devices as if each field device were independently connected to the network.

The illustrated network port 114 of the multi-channel I/O network module 102 has one port MAC address 116 but functions as a network switch having multiple IP addresses and/or MAC addresses behind the switch associated with the port MAC address. A controller on the process control network could write all data for field devices attached to the I/O network module 102 to the single MAC address of the network port and the network port then functions as a switch conveying the data to the correct field device. The controller in possible embodiments would not have knowledge of MAC addresses behind the network switch 114, even though each I/O channel 118 in embodiments would have its own MAC address associated with its own network IP address.

Embodiments of the single-channel I/O network module and multi-channel I/O network module can utilize fixed-mode conversion circuits, eliminate interposer capability by hardwiring signal processing or pass-through in an I/O channel, and can utilize wireless ports instead of, or in addition to, wired ports.

Figure 3:
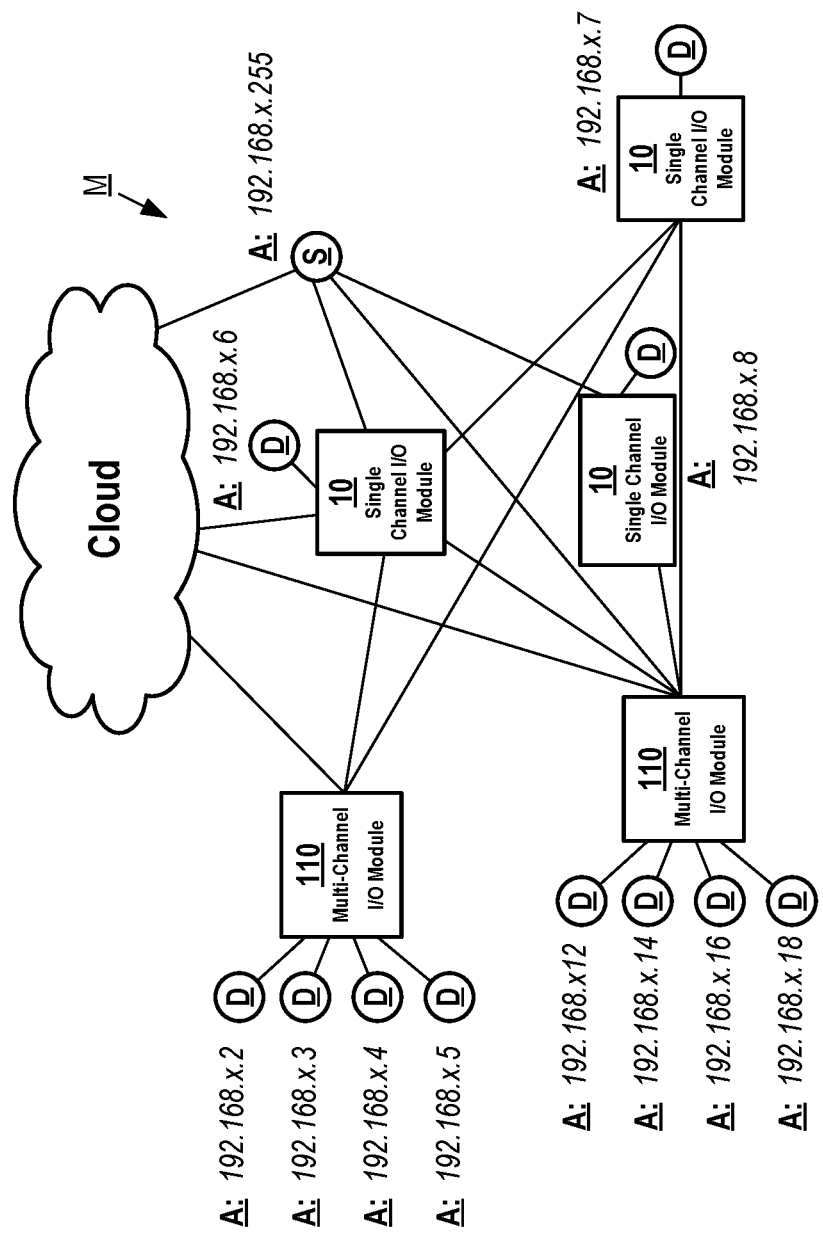
FIG. 3 is a schematic diagram of an Ethernet-based local process control network formed at least in part by interconnecting single-channel and/or multi-channel modules.

FIG. 3 illustrates a wired, a wireless, or part wired-part wireless Ethernet-based process control network N that includes single-channel I/O network modules 10 and multi-channel I/O network modules 102 to interconnect field devices D remote from the I/O network modules to a control system S (to simplify the drawing no network hub or switches are shown). Each field device D and the control system S is identified using a static, unique IPv4 network address A (IPv6 or other network-compatible addressing protocol can be used in other process control network embodiments). Dynamic IP addressing of I/O network modules using DHCP or other dynamic network addressing protocols is also possible.

No hierarchical network structure is required of the network, and each device can have a communication path to all other devices. Network switches and hubs can be used in the network as needed to interconnect the control system and field devices with one another or to other networks via, for example, network gateways or the Cloud.

Network topologies can be formed for enhanced security and network reliability. For example, a ring topology can be used for network redundancy. Field wire terminations can be physically distributed or moved throughout the physical plant without impacting the logical network connections between field devices. Network connections can also be extended to the "Cloud" for connection of the control system and field devices to remote network resources.

Other examples of electrical connectors that can be used to land wires of a field device in embodiments of single-field device I/O connectors or multi-field device I/O connectors in accordance with this disclosure include, but are not limited to, pluggable wire connectors in which the wires terminate on the electrical connectors, fixed terminals in which the wires enter terminals fixed directly on the base, electrical connectors that are removably mounted on the base to enable mechanical and/or electrical disconnection of the electrical connectors from the base without disturbing field wire attachments to the electrical connectors, male or female electrical connectors that mate with corresponding female or male electrical connectors attached to and forming part of individual field wires, cable connectors for connecting a cable containing the field wires extending from the field device, and the like.

While one or more embodiments are disclosed and described, it is understood that this is capable of modification and that the scope of the disclosure is not limited to the precise details set forth but includes modifications obvious to a person of ordinary skill in possession of this disclosure, including (but not limited to) changes in material selection, network topology, network data and addressing protocols, network physical layer and type or number of network ports (including wireless network ports for connecting to wireless process control networks), types or numbers of electrical connectors for connecting field wires of a field device (for non-limiting examples of types, terminals or cable connectors), and also such changes and alterations as fall within the purview of the disclosure and the following claims.

What is claimed is:

1. An I/O network module for a digital process control network, the I/O network module comprising:
    a base mounting a set of electrical connectors, an I/O channel, and a network port, the set of electrical connectors comprising at least one electrical connector;
    the network port compatible with the process control network for attaching the I/O network module to the process control network;
    the set of electrical connectors being connectable with field wires extending from a field device to carry I/O signals between the set of electrical connectors and the field device;
    the I/O channel including the set of electrical connectors and extending to the network port to carry signals between the network port and the set of electrical connectors, the I/O channel comprising a conversion circuit configured to convert between I/O signals and a digital signal compatible with the process control network; and
    the I/O channel being associated with a unique network address when the I/O network module is attached to the process control network whereby a field device when attached to the I/O module can communicate over the process control network using the network address.

2. The I/O network module of claim 1 wherein the conversion circuit is a selectable-mode conversion circuit.

3. The I/O network module of claim 1 wherein the network port is an Ethernet-compatible network port.

4. The I/O network module of claim 3 wherein the conversion circuit is configured to convert between I/O signals and one of the following formats: Ethernet/IP and OPC UA.

5. The I/O network module of claim 1 wherein the network address is a TCP/IP IPv4 or TCP/IP IPv6 network address.

6. The I/O network module of claim 1 wherein the network address is a static network address.

7. The I/O network module of claim 1 wherein the network address is a dynamic network address obtained when the I/O network module is attached to the process control network.

8. The I/O network module of claim 1 wherein the network port has a MAC address.

9. The I/O network module of claim 1 comprising an I/O module removably attached to the base that defines a portion of the I/O channel.

10. The I/O network module of claim 1 wherein the I/O network module is a single-channel I/O network module.

11. The I/O network module of claim 1 wherein the I/O network module is a multi-channel I/O network module wherein the set of electrical connectors is a first set of a plurality of sets of electrical connectors and the I/O channel is a first I/O channel of a plurality of I/O channels, each I/O channel extending from a respective set of electrical connectors to the network port, and each I/O channel being associated with a unique network address when the I/O network module is attached to the digital process control network.

12. The I/O network module of claim 11 comprising a terminal block that comprises the plurality of electrical connectors.

13. The I/O network module of claim 11 comprising a common monitoring circuit being disposed between the conversion circuits of the plurality of I/O channels and the network port, the monitoring circuit being configured to route digital signals received from the conversion circuits to the network port and to route digital signals received from the network port associated with a network address associated with an I/O channel of the plurality of I/O channels to the I/O channel associated with the network address.

14. The I/O network module of claim 11 wherein the network port is configured to function as a network switch that selectively connects the network port to one of the plurality of I/O channels to transfer data to the one I/O channel based on the network address associated with the data received into the network port from the process control network.

15. A digital process control network comprising:
    one or more I/O network modules attached to the process control network;
    each I/O network module comprising a base comprising a set of electrical connectors, an I/O channel, and a network port, the set of electrical connectors comprising at least one electrical connector, the network port compatible with the process control network and attached to the process control network for communications with the process control network, the set of electrical connectors being connected to a set of field wires extending from a field device spaced away from the I/O network module to carry I/O signals between the set of electrical connectors and the field device, and the I/O channel including the set of electrical connectors and extending to the network port to carry signals between the network port and the set of electrical connectors, the I/O channel comprising a conversion circuit being configured to convert between I/O signals and a digital signal compatible with the process control network, and the I/O channel being associated with a unique network address.

16. The process control network of claim 15 wherein the one or more I/O network modules comprises at least one single-channel I/O network module.

17. The process control network of claim 15 wherein the one or more I/O network modules comprises at least one multi-channel I/O network module wherein the set of electrical connectors is a first set of a plurality of sets of electrical connectors and the I/O channel is a first I/O channel of a plurality of like I/O channels, each I/O channel extending from a respective set of electrical connectors to the network port, each set of electrical connectors connectable to field wires extending from a respective field device spaced away from the multi-channel I/O network module, and each I/O channel of the plurality of I/O channels being associated with a respective network address different from the network addresses of the other I/O channels of the plurality of I/O channels.

18. The process control network of claim 17 wherein each at least one multi-channel I/O network module comprises a monitoring circuit disposed between the plurality of I/O channels and the network port, the monitoring circuit being configured to route digital signals received from each I/O channel of the plurality of I/O channels to the network port and to route digital signals received from the network port addressed to any of the network addresses associated with the plurality of I/O channels to the I/O channel associated with the network address.

19. The process control network of claim 18 wherein the monitoring circuit of each at least one multi-channel I/O network module is a common monitoring circuit connected to each I/O channel of the plurality of I/O channels.

20. The process control network of claim 18 wherein the monitoring circuit of each at least one multi-channel I/O network module is configured to tag data received from each I/O channel of the plurality of I/O channels with the network address associated with the I/O channel.

21. A multi-channel I/O network module for a digital process control network, the multi-channel I/O network module comprising:

a base mounting a plurality of sets of electrical connectors, a plurality of I/O channels, and a network port, each set of electrical connectors of the plurality of electrical connectors comprising at least one electrical connector;

the network port being compatible with the process control network for attaching the multichannel I/O network module to the process control network;

each set of the plurality of sets of electrical connectors being connectable with field wires extending from a field device to carry I/O signals between the set of electrical connectors and the field device;

each I/O channel of the plurality of I/O channels including a respective set of electrical connectors of the plurality of sets of electrical connectors, each I/O channel extending from the respective set of electrical connectors to the network port to carry an I/O signal between the network port and the respective set of electrical connectors;

each I/O channel of the plurality of I/O channels comprising a conversion circuit being configured to convert between the I/O signals and a digital signal compatible with the process control network;

each I/O channel of the plurality of I/O channels being associated with a respective unique network address;

a common monitoring circuit being disposed between the conversion circuits of the plurality of I/O channels and the network port; and the common monitoring circuit being configured to route digital signals received from the conversion circuits to the network port and to route digital signals received from the network port associated with a field device attached to the I/O network module to the I/O channel connected to the field device.

\* \* \* \* \*